United States Patent [19]
Wolff

[11] Patent Number: 5,213,251
[45] Date of Patent: May 25, 1993

[54] METHOD FOR FABRICATING A WEAR-RESISTANT MAGNET-CONTAINING COMPONENT AND RESULTING ARTICLE

[76] Inventor: George D. Wolff, 2929 Dundee Rd., Winter Haven, Fla. 33884

[21] Appl. No.: 915,331

[22] Filed: Jul. 17, 1992

[51] Int. Cl.⁵ .................. G01M 15/00; B23K 31/00
[52] U.S. Cl. ........................... 228/199; 228/176; 228/231; 123/617; 73/119 A; 148/516; 148/528
[58] Field of Search .............. 228/176, 199, 231; 123/612, 617; 73/119 A; 148/239, 516, 528

[56] References Cited
U.S. PATENT DOCUMENTS 4,386,522  6/1983  Wolff ......................... 73/119 A
4,667,511  5/1987  Mausner ..................... 73/119 A
5,069,064  12/1991 Wolff ......................... 73/119 A

*Primary Examiner*—Samuel M. Heinrich
*Attorney, Agent, or Firm*—Allen, Dyer, Doppelt, Franjola & Milbrath

[57] ABSTRACT

A piece to be magnetized and a covering cap are brazed together to a member, such as a spring seat for a diesel engine injector needle lift sensor. The entire assembly is then subjected to a vacuum ion treatment to case-harden at least the cap and the wear surface of the member. Either before or after the member is case-hardened, the assembly is subjected to an electromagnetic field to magnetize the piece through the cap.

12 Claims, 1 Drawing Sheet

METHOD FOR FABRICATING A WEAR-RESISTANT MAGNET-CONTAINING COMPONENT AND RESULTING ARTICLE

BACKGROUND OF THE INVENTION

The present invention relates generally to internal combustion engines, and more particularly relates to methods for fabricating sensors useful in maximizing the efficiency of engine operation.

In U.S. Pat. No. 5,069,064, there is disclosed a construction for a magnetic spring seat attachment useful with injection sensors for diesel engines. (The attachment disclosed in U.S. Pat. No. 5,069,064 is an improvement over a similar arrangement disclosed in U.S. Pat. No. 4,386,522).

The term "ion nitriding" refers to a thermal-chemical process or case-hardening iron containing metal surfaces.

SUMMARY OF THE INVENTION

The present invention is directed to a method for fabricating a wear-resistant, magnet-containing component, and in particular relates to a method for fabricating a magnetic spring seat attachment for diesel engine fuel injectors.

In accordance with the present invention, a piece to be magnetized is brazed to a member which may comprise a spring seat for a diesel engine injector needle lift sensor. At the same time, a cap is brazed over the piece and to the member. The entire assembly is then subjected to a vacuum ion treatment to case-harden at least the cap and a wear surface of the member. Either before or after the member is subjected to the case-hardening vacuum ion process to case-harden the wear surface of the member, the assembly is subjected to an electromagnetic field to magnetize the piece through the covering cap fixed over the piece to the member.

THE DRAWING

DETAILED DESCRIPTION

Figure 1:
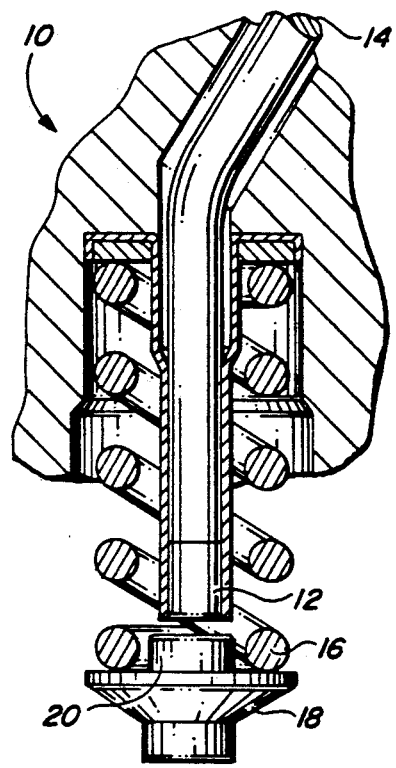
FIG. 1 is a side view, partially in cross section, of a diesel engine fuel injector sensor and associated hardware.
Figure 2:
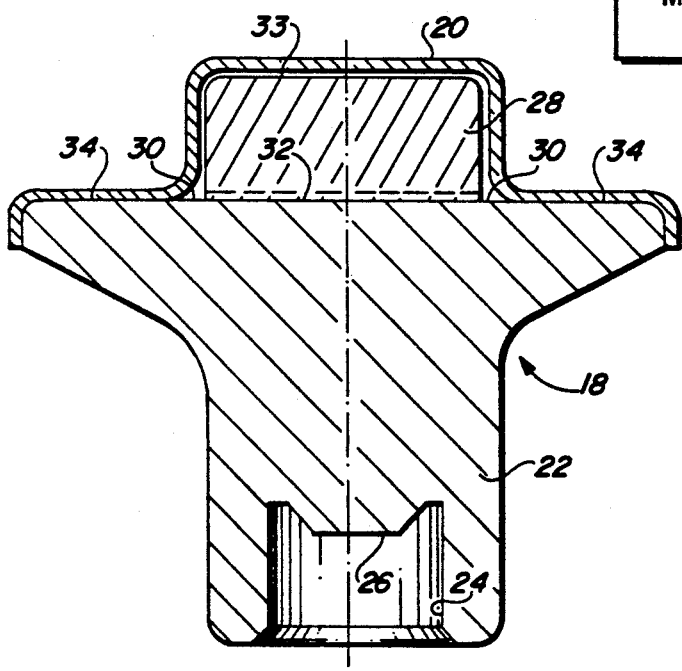
FIG. 2 is a cross section of a spring seat assembly which forms a part of the construction of FIG. 1.

Referring first to FIG. 1, there is illustrated a portion 10 of a fuel injector sensor assembly, including a sensor element 12 and associated lead 14 which is dimensioned to extend through the injector spring 16 into proximity with the injector spring seat, referred to generally by reference numeral 18. The spring seat assembly 18 includes an upper cap 20 that extends upwardly through the spring 16 and, as shown in FIG. 2, the cap 20 covers a magnet 28. In operation, the motion of the magnet 28 upwardly with the spring 16 is sensed by element 12 to provide precise fuel injection information, to thereby maximize the efficiency of engine operation and reduce unwanted exhaust emissions. Referring to FIG. 2, the spring seat assembly 18 comprises a spring seat body 22 preferably formed from a nickel chromium steel. The body 22 includes a recess 24 into which a fuel injector needle (not shown) extends during engine operation. The recess includes a wear surface 26 which specifically engages an extension of the needle.

As shown in the upper portion of FIG. 2, the magnet piece 28 is attached to the upper surface 30 of the spring seat body 22 by a brazing joint 32. The cap 20 is fabricated of a non-magnetic, deep-drawn steel material, and is brazed along surface 30 at joints 34 and around magnet piece 28, preferably at the same time that the piece 28 is brazed to the surface 30.

Figure 3:
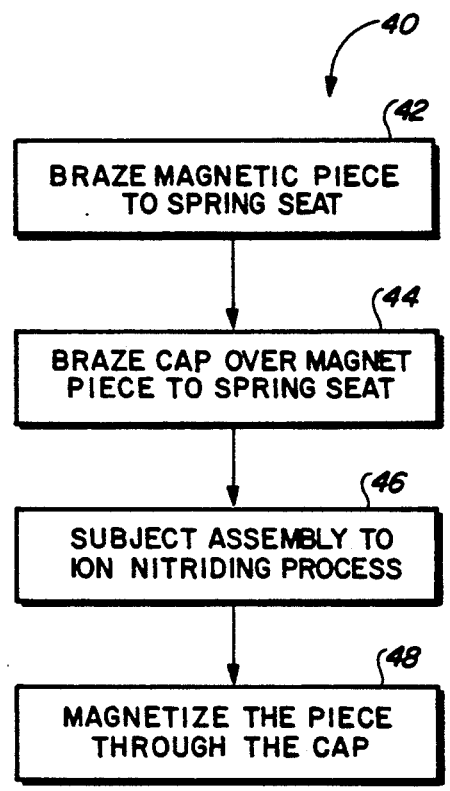
FIG. 3 is a flow chart illustrating the processing steps according to the method of the present invention.

The specific details of the method of the present invention will now be described with reference to FIG. 2 and the flow chart of FIG. 3.

The cap 20, the spring seat 22 and the magnetizable piece which is to become the magnet 28 are brazed together at joints 32, 33 and 34 (Step 42). Preferably, the brazing step is carried out at a temperature on the order of slightly over 1,000° C., using Silver braze 505. The piece 28 is then magnetized after it has been brazed to the upper surface 30, either before or after the vacuum ion treatment, discussed next.

The entire combination of the piece 28, cap 20 and spring seat body 22 (including wear surface 26) are subjected to a vacuum ion treatment at the necessary elevated temperature in order to case-harden at least the wear surface 26 and the cap 20 (Step 46); however, all of the exposed surfaces of the combination will become case-hardened in the treatment. Typically, the ion nitriding process is carried out at a temperature on the order of 320° C., and therefore does not adversely affect the braze joints 32, 34.

There are a number of processors in the United States who provide services for vacuum ion treatment, including ion nitriding, ion carbonizing, ion boronizing, ion plating and ion sputtering. By way of example, such processes are available from Sun Steel Treating, Inc. of South Lyon, Mich. In an ion nitriding process, the spring seat assembly 18 (with piece 28 and cap 20 already brazed in place) is placed inside a furnace, and a vacuum is drawn within the furnace to less than 50 microns of mercury. An inner gas, such as hydrogen, is then injected into the furnace and the assembly is heated. When the temperature reaches a point where the hydrogen gas begins to discharge a positive ion, the spring seat assembly is subjected to a high adhesive voltage, creating a positively charge potential resulting in a bombardment of the positive hydrogen ions across the surface of the assembly. Nitrogen gas is then injected into the furnace, and also ionizes and bombards the assembly. As a result, ferrous nitride layers are developed along any exposed surface having an iron-containing composition, such as the wear surface 26 and the surface of cap 20, thereby achieving the desired case-hardening.

After the assembly 18 is cooled, the piece 28 is then subjected to an electromagnetic field of sufficient strength to magnetize the piece 28 through the cap 20 (Step 48). As noted previously, the magnetizing step may be carried out before the ion nitriding step.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method for fabricating a wear-resistant, magnet-containing component, comprising the steps of:
   providing a piece to be magnetized;

brazing the piece to a member having a wear surface and brazing a cap over the piece to the member;

subjecting the member and the cap to case-hardening at a temperature substantially below the temperature of the brazing step; and magnetizing the piece.

2. The method recited in claim 1 wherein the vacuum ion treatment comprises an ion nitriding process.

3. The method recited in claim 1 wherein the vacuum ion treatment comprises an ion carbonizing process.

4. The method recited in claim 1 wherein the vacuum ion treatment comprises an ion boronizing process.

5. The method recited in claim 1 wherein the vacuum ion treatment comprises an ion plating process.

6. The method recited in claim 1 wherein the vacuum ion treatment comprises an ion sputtering process.

7. The method recited in claim 1 wherein the step of affixing the piece to a member comprises brazing.

8. The method recited in claim 1 wherein the brazing step is carried out at a temperature on the order of 1,000° C. or above.

9. An article made according to the method of claim 1.

10. A method for fabricating a magnetic spring seat attachment for diesel engine fuel injectors, comprising the steps of:

providing a piece to be magnetized, a cap dimensioned to fit over the piece and a spring seat having a wear surface dimensioned to engage a diesel engine injector needle under high wear conditions;

brazing the piece to a mounting surface of the spring seat;

covering the piece with the cap and brazing the cap to the mounting surface;

subjecting the piece-cap-spring seat combination to a vacuum ion treatment to case-harden at least the cap and the wear surface of the spring seat; and subjecting the combination to a magnetic field of sufficient strength to magnetize the part through the cap.

11. The method recited in claim 10 wherein the vacuum ion treatment comprises an ion nitriding process.

12. A magnet spring seat attachment for diesel engines made according to the method of claim 10.

* * * * *